3,428,671
BROMIDE ION PROMOTED OXIDATION OF SULFIDE-SULFUR BY LOWER DIALKYL SULFOXIDES
William G. Toland, San Rafael, Calif., assignor to Chevron Research Company, San Francisco, Calif., a corporation of Delaware
No Drawing. Filed Sept. 8, 1965, Ser. No. 485,938
U.S. Cl. 260—51.3  12 Claims
Int. Cl. C07c *147/02, 149/06*

ABSTRACT OF THE DISCLOSURE

Compounds containing sulfide-sulfur are oxidized by lower dialkyl sulfoxides in a liquid phase reaction promoted by bromide ion. In the process the sulfoxide is converted to the corresponding dialkyl sulfide and the oxidation state of the sulfide-sulfur atom is increased.

---

This invention relates to an oxidation process in which lower dialkyl sulfoxides are the oxidizing agents. More particularly, it relates to liquid phase oxidations by lower alkyl sulfoxides promoted by bromide ion solute in which sulfoxide oxygen is transferred to a compound containing an oxidizable sulfur atom.

A few reactions are known in the art wherein alkyl sulfoxide oxygen is transferred to an oxidizable sulfide sulfur atom. However, no practical value is seen for them for a number of reasons, including their limited scope, slow rates and product nature.

It has now been found that lower dialkyl sulfoxides can be effectively used as oxidizing agents in oxidation reactions promoted by bromide ion solute. The reactions take place in the liquid phase at temperatures above about 100° C. but below the pyrolysis temperature of the compound to be oxidized. In the oxidation the sulfoxide oxygen atom is transferred to a compound which is soluble in the sulfoxide and which contains at least one oxidizable sulfur atom, thereby increasing its oxidation state and converting the dialkyl sulfoxide to the corresponding dialkyl sulfide.

In general, the resulting dialkyl sulfide can be readily removed from the reaction zone because it is relatively much more volatile than the other products or the lower dialkyl sulfoxide oxidant. Reaction rates in the presence of bromide ion are substantial, and so long as a solution of bromide ion and a compound containing an oxidizable sulfur atom is heated as noted, the subject oxidation takes place.

In accordance with the present process, about three mols of a lower dialkyl sulfoxide having dissolved therein one mol of an alkanethiol and about 0.1 mol of ammonium bromide are heated to about 170° C. in a reactor. As the oxidation progresses, liberated dialkyl sulfide is passed from the reactor via a suitable vapor removal port above the liquid level and collected by condensation. The amount of sulfide collected and the rate of the collection is a measure of the degree and rate of the oxidation reaction.

The principal reaction products are the corresponding alkanesulfonic acid and dialkyl sulfide.

By lower dialkyl sulfoxides is means those of the formula (RCH$_2$)$_2$SO

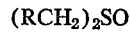

wherein R is hydrogen or a hydrocarbon radical containing less than 10 carbon atoms. R in the formula may be the same or different. The preferred sulfoxides are the n-alkyl sulfoxides having less than 11 carbon atoms per alkyl group.

The bromide ion required for the catalysis of the subject oxidation may be introduced to the reaction system in the form of any soluble bromide salt, hydrobromic acid or even elemental bromine. Ammonium bromide is a particularly convenient form for the introduction of bromide ion to the process.

In general only a minor amount of bromide ion is useful to catalyze the reaction. Mere trace amounts of bromide ion are sufficient to produce an appreciable catalysis. Effective and preferred amounts of bromide ion relative to the compound to be oxidized are in the range from about 0.01 to 0.1 mol of bromide per mol of the oxidizable compound. Larger relative amounts can be used but are usually less satisfactory in terms of ease of product purification, recovery and the like.

By pyrolysis temperatures relative to a feed compound is meant one at which thermal scission of the chemical bonds thereof is appreciable, i.e., greater than 20 percent of the compound is dissociated over a period of one hour. In general, pyrolysis temperatures are expected to be in the range 350–500° C.

The present oxidation process is a liquid phase reaction. Therefore, the reaction system requires a pressure sufficient to maintain at least the lower alkyl sulfoxide in the liquid phase. In general this means the reaction may be carried out under atmospheric pressure. Feed compounds more volatile than the dialkyl sulfoxide oxidizing agents can be oxidized under superatmospheric pressures. Usually it is more convenient to introduce volatile reactants into the liquid sulfoxide at atmospheric pressure. The unconverted feed found in the exit gas stream can be recycled to the reaction zone. The need for costly pressure equipment is thereby avoided.

Compounds containing sulfide-sulfur atoms are, in general, oxidizable in the subject process, provided of course, that they have an appreciable solubility in the contemplated lower dialkyl sulfoxides. By sulfide-sulfur containing compounds is means by definition elemental sulfur, i.e., S$_x$, hydrogen sulfide; salts of hydrogen sulfide, such as (NH$_4$)$_2$S, (NH$_4$)$_2$S$_x$, and the like; organic compounds of the general formula R$_1$S$_x$R$_2$ wherein R$_1$ may be hydrogen and R$_1$ and R$_2$ may be the same or different hydrocarbon radicals and x is an interger.

Among the sulfide-sulfur containing compounds, the preferred types are of the general formulas R′SH, R′SSR′, and R′SR′ wherein R′ may be the same or different hydrocarbon radicals having less than about 20 carbon atoms per group. Organic thiols of the formula R(SH)$_x$ in which R is a hydrocarbon radical having less than about 20 carbon atoms and in which $x$ is less than 3, i.e., is 1 or 2, and which yield the corresponding sulfonic acids are a preferred class. Of this preferred subclass, the corresponding n-alkyl thiols are the most preferred process feed compounds.

Representative organic sulfide-sulfur containing compounds which may be oxidized in the process are methanethiol; benzenethiol; α-naphthalenethiol; p-toluenethiol; p,p′-benzenedithiol; di-n-butyl disulfide; i-propylethyl disulfide; 1-8-octanedithiol; 1,12-dodecanedithiol; 1,6-hexanedithiol; 9-fluorylmethanethiol; 2-(α-naphthyl) ethanethiol; benzylthiol; o-methylbenzylthiol; m-ethylbenzylthiol; 2,4-diphenylbutanethiol; 2-phenyl-2-methylethanethiol; 2-methylhexanethiol; 2-ethylhexanethiol; 2-propylhexanethiol; 3-methylpentanethiol– 3-ethylpentanethiol; 4 - propylheptanethiol; 2 - methyloctanethiol; 3-methyloctanethiol; 4-methyloctanethiol; 2,3-diethylpentanethiol; 2,4-dimethylheptanethiol; 2-butyldodecanethiol; 3 - i - propylhexadecanethiol; 7-cyclohexylheptanethiol; 4 - cyclopentyloctanethiol; 2 - pentyl - nonanethiol;

2-hexyldodecanethiol; 2-hexyl-decanethiol and 2-cyclohexylethanethiol.

Representative n-alkanethiol feed compounds are butanethiol; pentanethiol; hexanethiol; heptanethiol; octanethiol; nonanethiol; decanethiol; undecanethiol; dodecanethiol tridecanethiol; tetradecanethiol; pentadecanethiol; hexadecanethiol; heptadecanethiol; octadecanethiol; nonadecanethiol; eicosanethiol, heneicosanethiol and the like.

The following examples illustrate the invention. They are not to be construed as limiting but are merely given for purposes of demonstration.

Example 1

This example illustrates that dimethylsulfoxide (DMSO) is incapable of oxidizing a mercaptan to a sulfonic acid in the absence of any bromide ion, even in the presence of an acid catalyst. A 500 milliliter flask equipped with a stirrer and a distillation head leading to a trap was charged with 50.5 grams (0.25 mol) of dodecylmercaptan, 156 grams (2.0 mols) of dimethylsulfoxide, and 1 gram of 96 percent sulfuric acid. The mixture was heated to a pot temperature of 178°C. over a period of eight hours. During this time the vapor temperature was held below 100° C. A total of 36.4 grams of distillate was collected in the trap. Contents of the flask were then distilled under 1 mm. of mercury yielding 102 grams of unreacted dimethylsulfoxide boiling at 35° C. The liquid remaining in the flask weighed 49.5 grams and solidified on standing. This was identified as uncoverted dodecylmercaptan. Titer of a sample showed no acidity. Using the standard Hyamine titration for surface active sulfonic acids, it was shown this product had no activity and contained no sulfonic acid.

Example 2

This example is a repeat of Example 1 but in which the sulfuric acid is replaced by ammonium bromide. All other quantities were identical. In this case the evolution of low boiling products began at about 125°C. The pot temperature was controlled to stay below 170° C. for a total of two hours. During this time the vapor temperature was almost continuously below 100° C. A total of 98 milliliters of distillate was collected. This was shown to consist largely of dimethylsulfide along with lesser quantities of water and some formaldehyde. A total of 84.9 grams of a black semi-solid remained in the bottom of the flask. A 33.8 gram aliquot of this product was slurried in water and neutralized to pH 8 with 5.9 grams of sodium hydroxide solution, further diluted with water and heated to dissolve all but a small amount of black solids. The mixture was then filtered while hot. The filtrate was cooled to room temperature and refiltered to recover 22.3 grams of white crystals. This product was shown to be the sodium salt of dodecylsulfonic acid. Its infrared spectrum matched that of a known sample of material. A Hyamine titration showed the product to be 100 percent surface active material. A small sample of the cake was recrystallized from ethyl alcohol and analyzed as follows: percent carbon 53.06, percent H 13.42, percent S 12.53 (theory for sodium salt of dodecylsulfonate, percent carbon 53, percent H 9.18, percent S 11.74).

Example 3

It is known that DMSO is relatively stable by itself. It can be distilled at atmospheric pressure with little decomposition. However, this example illustrates how bromide ion catalyzes the disproportionation of DMSO, in which 1 molecule can oxidize another, itself being reduced. The products are dimethylsulfide and methane sulfonic acid. The same equipment was used as in Example 1. It was charged with 156 grams (2 mols) of DMSO and 1 gram of ammonium bromide. The mixture was heated to a pot temperature of 175° C. for 5½ hours. The vapor temperature was maintained below 100° C. During this time a total of 102 milliliters of condensate were recovered. Some polyformaldehyde was present as a white solid in the distillation head. Some water phase was also present in the condensate. The overhead organic phase was shown by redistillation to be largely dimethylsulfide. It boiled at 37° C. The material remaining in the pot consisted of 41.7 grams of a black liquid. A 20 gram aliquot of this material was neutralized with aqueous ammonia and filtered from insoluble black solids (1 gram). Evaporation of the ammonium salts left 21.2 grams of the white solid residue. This was recrystallized from ethanol to give a product with a melting point of 191–195.7° C. A mixed melting point with a known sample of ammonium methane sulfonate melted at 193–194° C. It had a saponification equivalent of 119.6 (theory, 113). Its infrared spectrum was identical with a known sample of ammonium methylsulfonate.

Example 4

This example illustrates an attempt to oxidize di-n-butylsulfide in the absence of bromide ion. A flash was charged with 68.4 grams of di-n-butylsulfide and 58.6 grams of DMSO. The mixture was heated to 165–175° C. with stirring for 14.5 hours. During this time a total of 33 milliliters of distillate was collected during which the vapor temperature never climbed above about 50°C. The bottoms product was then distilled at 0.3–0.4 mm. of mercury pressure. There was obtained 75 milliliters of unconverted di-n-butylsulfide. No dibutylsulfoxide could be found.

Example 5

This example employing bromide ion can be compared with the preceding one to show the effect of the proper catalyst. Equipment similar to that in Example 1 was used. It was charged with 73 grams (0.5 mol) of di-n-butylsulfide, 156 grams (2.0 mols) of DMSO and 1.0 gram of ammonium bromide. The mixture was heated to a maximum pot temperature of 155° C. over a 2¾ hour period. During this time the vapor temperature climbed to a maximum of 70° C. and 40 milliliters of condensate were obtained. Redistillation of the condensate showed it to be largely dimethylsulfide, boiling point 37–38° C. A 60.2 gram aliquot of the product from the flask was diluted with 500 milliliters of water and the phases separated. Chloroform was used to aid separation. Evaporation of the chloroform phase left a residue of 27.9 grams. This was dissolved in toluene and chilled in an acetone-Dry Ice mixture to obtain a mass of crystals which melted at room temperature. Because of this problem the filtrate was diluted further with methylcyclohexane, chilled to about −60° C. and again filtered. The cake obtained again tended to melt at room temperature but was finally recrystallized from pentane to give white crystals, melting point 32.8–34.6° C. This was shown by infrared spectrum to be di-n-butylsulfoxide. In addition, some of the disproportionation products of DMSO were also found.

Example 6

This example illustrates the oxidation of hydrogen sulfide to sulfuric acid. The same equipment was used as in Example 1. It was charged with 234 grams (3 mols) of DMSO and 1 gram of ammonium bromide. Hydrogen sulfide gas was passed in continuously. The pot temperature was maintained at about 150° C. over a period of about one hour. The vapor temperature rose to a maximum of 105° C. and a total of 96.7 grams of condensate was collected. A large portion of this was dimethylsulfide as shown by redistillation, which yielded 27 grams of the material boiling at 37° C.; the residue in the reaction flask consisted of 158.5 grams of an acidic material which was diluted to 250 milliliters with water and filtered to give 1 gram of dark colored cake which was discarded. A ¹⁄₁₀ aliquot of the filtrate weighing 28.02 grams was treated with barium chloride solution under acidic conditions, until no more precipitate was formed. The mixture was digested, filtered and dried to give 6.35 grams of white barium sulfate cake. These data demonstrate that 0.27 mol of sulfuric acid was formed by the DMSO oxidation of hydrogen sulfide.

Representative equations for the above chemical reactions are believed to be as follows:

(1)
$$RSH + 3(CH_3)_2SO \xrightarrow[\Delta]{Br^-} RSO_3H + (CH_3)_2S$$

(2)
$$(CH_3CH_2CH_2CH_2)_2S + (CH_3)_2SO \xrightarrow[\Delta]{Br^-}$$
$$(CH_3CH_2CH_2CH_2)_2SO + (CH_3)_2S$$

(3)
$$4(CH_3)_2SO \xrightarrow[\Delta]{Br^-} CH_3SO_3H + 3(CH_3)_2S + (CH_2O)_x$$

(4)
$$H_2S + 4(CH_3)_2SO \xrightarrow[\Delta]{Br^-} H_2SO_4 + 4(CH_3)_2S$$

I claim:
1. The process for the oxidation of a sulfide-sulfur containing compound selected from the group consisting of elemental sulfur, hydrogen sulfide, ammonium sulfide, ammonium polysulfide and a compound of the formula $R_1S_xR_2$ wherein $R_1$ and $R_2$ are selected from the group consisting of hydrogen and hydrocarbon radicals and $x$ is an integer; said compound having an appreciable solubility in a sulfoxide selected from the group consisting of lower dialkyl sulfoxides, which comprises heating in the liquid phase a solution consisting essentially of said lower dialkyl sulfoxide and said compound at a temperature in the range from about 100° C. and below the pyrolysis temperature of said compound, wherein said solution contains a minor amount of bromide ion solute, thereby transferring the sulfoxide oxygen atom to a sulfide sulfur atom of said compound and reducing said sulfoxide to the corresponding lower dialkyl sulfide.

2. The process for the oxidation of a compound of the formula $$RS_xR'$$

wherein R and R' are selected from the group consisting of hydrogen and hydrocarbon radicals containing less than 20 carbon atoms and wherein $x$ is in the range 1–2, inclusive, which comprises heating in the liquid phase a solution consisting essentially of a lower dialkyl sulfoxide and said compound at a temperature in the range from about 100° C. and below the pyrolysis temperature of said compound, wherein said solution contains a minor amount of bromide ion solute, thereby transferring the sulfoxide oxygen atom to a sulfide sulfur atom of said compound and reducing said sulfoxide to the corresponding lower dialkyl sulfide.

3. The process as in claim 2 wherein said compound is a dialkyl sulfide which is thereby converted to the corresponding sulfoxide.

4. The process as in claim 2 wherein said compound is an organic thiol of the formula $$R(SH)_x$$

wherein R is a hydrocarbon radical and $x$ is less than 3, thereby producing the corresponding lower dialkyl sulfide and the sulfonic acid $R(SO_3H)_x$.

5. The process for the production of a sulfonic acid of the formula $YSO_3H$ from a thiol of the formula YSH wherein Y is a hydrocarbon radical containing from 1 to 19 carbon atoms, which comprises heating in the liquid phase a solution consisting essentially of said thiol dissolved in a sulfoxide of the formula $$(RCH_2)SO(R'CH_2)$$

wherein R and R' are selected from the group consisting of hydrogen and hydrocarbon radicals containing less than 10 carbon atoms, wherein said heating is at a temperature above about 100° C. but below the pyrolysis temperature of said thiol, wherein said solution contains a minor amount of bromide ion solute, and wherein the resulting dialkyl sulfide, $RCH_2SCH_2R'$, is removed by distillation from the reacting mixture, thereby producing said $YSO_3H$ sulfonic acid.

6. The process as in claim 5 wherein the thiol YSH is an n-alkanethiol.

7. The process as in claim 5 wherein for each mol of the thiol there is present from about 0.01 to 0.1 mol of bromide ion solute.

8. The process for the production of a sulfoxide of the formula YSOY' from a sulfide of the formula YSY' wherein Y and Y' are selected from the group consisting of hydrocarbon radicals containing from 1 to 19 carbon atoms which comprises heating in the liquid phase a solution consisting essentially of said sulfide dissolved in a sulfoxide of the formula $$(RCH_2)SO(R'CH_2)$$

wherein R and R' are selected from the group consisting of hydrogen and hydrocarbon radicals containing less than 10 carbon atoms, wherein said heating is at a temperature above about 100° C. but below the pyrolysis temperature of said sulfide, wherein said solution contains a minor amount of bromide ion solute, wherein the resulting dialkyl sulfide, $RCH_2SCH_2R'$, is removed by distillation from the reacting mixture, thereby producing said sulfoxide YSOY'.

9. The process as in claim 8 wherein said sulfide is an n-alkyl sulfide.

10. The process for the production of n-dodecylsulfonic acid from n-dodecylthiol which comprises heating a solution consisting essentially of said thiol dissolved in dimethylsulfoxide wherein for each mol of the thiol about 8 mols of the sulfoxide and a minor amount of ammonium bromide solute are present, said heating being at a temperature in the range from about 125° C. to 170° C. for a period of about 2 hours, wherein the resulting dimethyl sulfide is distilled from the reacting mixture, thereby producing n-dodecylsulfonic acid.

11. The process for the production of di-n-butylsulfoxide from di-n-butylsulfide, which comprises heating a solution consisting essentially of said sulfide dissolved in dimethylsulfoxide, wherein for each mol of the sulfide about 4 mols of dimethylsulfoxide and a minor amount of ammonium bromide solute are present, said heating being at a temperature in the range from about 70° C. to 155° C. for a period of about 2.75 hours, wherein the resulting dimethylsulfide is distilled from the reacting mixture, thereby producing di-n-butylsulfoxide.

12. Process for the production of methanesulfonic acid which comprises heating dimethyl sulfoxide containing a minor amount of bromide ion solute at a temperature in the range above about 100° C. but below the pyrolysis temperature of methanesulfonic acid, removing by distillation from the reaction mixture the resulting dimethyl sulfide, thereby producing methanesulfonic acid.

References Cited
Oae et al. Chemical Abstracts, 63, 9777g (1965).

DANIEL D. HORWITZ, *Primary Examiner.*

U.S. Cl. X.R.

260—503, 505, 607, 609, 606; 23—168